(12) United States Patent
Zhang et al.

(10) Patent No.: US 12,207,071 B2
(45) Date of Patent: Jan. 21, 2025

(54) METHOD AND SYSTEM FOR TRANSMITTING AUDIO DATA, TWS EARPHONE PAIR, CHIP AND MEDIUM

(71) Applicant: ZHUHAI JIELI TECHNOLOGY CO., LTD, Zhuhai (CN)

(72) Inventors: Zhiying Zhang, Zhuhai (CN); Yao Sang, Zhuhai (CN); Changji Wang, Zhuhai (CN)

(73) Assignee: ZHUHAI JIELI TECHNOLOGY CO., LTD, Zhuhai (CN)

( * ) Notice: Subject to any disclaimer, the term of this patent is extended or adjusted under 35 U.S.C. 154(b) by 217 days.

(21) Appl. No.: 17/970,038

(22) Filed: Oct. 20, 2022

(65) Prior Publication Data
US 2023/0045489 A1 Feb. 9, 2023

Related U.S. Application Data

(63) Continuation of application No. PCT/CN2020/119601, filed on Sep. 30, 2020.

(30) Foreign Application Priority Data

Jul. 27, 2020 (CN) .......................... 202010732477.4

(51) Int. Cl.
*H04R 5/04* (2006.01)
*H04L 1/16* (2023.01)
(Continued)

(52) U.S. Cl.
CPC ................. *H04R 5/04* (2013.01); *H04L 1/16* (2013.01); *H04R 1/1016* (2013.01);
(Continued)

(58) Field of Classification Search
CPC ...... H04R 5/04; H04R 1/1016; H04R 1/1041; H04R 5/033; H04R 2420/07; H04L 1/16
See application file for complete search history.

(56) References Cited

U.S. PATENT DOCUMENTS 10,412,481 B1 9/2019 Wu et al.
10,840,995 B1 * 11/2020 Luong .................. H04L 43/106
(Continued)

FOREIGN PATENT DOCUMENTS

CN 106535081 A 3/2017
CN 106559861 A 4/2017
(Continued)

OTHER PUBLICATIONS

International Search Report for corresponding Application No. PCT/CN2020/119601 dated Apr. 27, 2021, 4 pages.
(Continued)

*Primary Examiner* — Andrew Sniezek
(74) *Attorney, Agent, or Firm* — Taft Stettinius & Hollister LLP

(57) ABSTRACT

A method for transmitting audio data, including: determining whether a TWS master device and a TWS slave device have received audio data; sending a first additional packet data to the TWS slave device according to a first determination that the TWS master device has received the audio data, and forwarding the audio data to the TWS slave device according to a second determination that the TWS master device has not received a second additional packet data, turning off a resending time window of the TWS master device; sending the second additional packet data to the TWS master device according to a third determination that the TWS slave device has received the audio data, and forwarding the audio data to the TWS master device according to a fourth determination that the TWS slave device has not received the first additional packet data, and turning off the resending time window of the TWS slave device.

14 Claims, 3 Drawing Sheets

(51) Int. Cl.
  *H04R 1/10* (2006.01)
  *H04R 5/033* (2006.01)
(52) U.S. Cl.
  CPC ........... *H04R 1/1041* (2013.01); *H04R 5/033* (2013.01); *H04R 2420/07* (2013.01)

(56) References Cited

U.S. PATENT DOCUMENTS

| 11,240,586 | B1* | 2/2022 | Yan ......................... H04W 4/80 |
| 2018/0084456 | A1 | 3/2018 | Gostev et al. |
| 2018/0352047 | A1 | 12/2018 | Wang et al. |
| 2019/0281437 | A1 | 9/2019 | Watson et al. |
| 2020/0252993 | A1* | 8/2020 | Srivastava ............ H04W 76/23 |

FOREIGN PATENT DOCUMENTS

| CN | 107872783 | A | 4/2018 |
| CN | 108419228 | A | 8/2018 |
| CN | 108901004 | A | 11/2018 |
| CN | 109561419 | A | 4/2019 |
| CN | 109660971 | A | 4/2019 |
| CN | 109995479 | A | 7/2019 |
| CN | 110267305 | A | 9/2019 |
| CN | 111435844 | A | 7/2020 |
| CN | 111436043 | A | 7/2020 |
| CN | 111436044 | A | 7/2020 |
| CN | 111447603 | A | 7/2020 |

OTHER PUBLICATIONS

Written Opinion for corresponding Application No. PCT/CN2020/119601 dated Apr. 27, 2021, 3 pages.
PCT International Search Authority document for corresponding Application No. PCT/CN2020/119601 dated Apr. 27, 2021, 1 page.
Chinese Office Action for corresponding Application No. PCT/CN2020/119601 dated Jun. 22, 2021, 10 pages.

* cited by examiner

METHOD AND SYSTEM FOR TRANSMITTING AUDIO DATA, TWS EARPHONE PAIR, CHIP AND MEDIUM

CROSS-REFERENCE TO RELATED APPLICATIONS

The present application is a continuation application of International Application PCT/CN2020/119601, filed on Sep. 30, 2020, which claims the priority of Chinese patent application No. 202010732477.4, filed on Jul. 27, 2020 and entitled "Method and System for Transmitting Audio Data, TWS Earphone Pair, Chip and Medium", the entire contents of which are hereby incorporated by reference in their entireties.

TECHNICAL FIELD

The present disclosure relates to the technical field of TWS (True Wireless Stereo) technology, particularly to a method and a system for transmitting audio data, a TWS earphone pair, a chip and a medium.

BACKGROUND

With the popularization of communication technology and Bluetooth technology, many types of TWS Bluetooth earphones appear on the market, which are free from the constraints of traditional wired earphones. The audio of mobile phone calls is wirelessly transmitted to the earphone through Bluetooth, which brings convenience to the user's daily life, and the true wireless stereo call can bring better hearing effects to listeners.

The TWS Bluetooth earphones include a master earphone and a slave earphone. An eSCO (Extended Synchronous Connection-Oriented) logical transmission is established between the master earphone and a mobile phone terminal, an eSCO transmission is also established between the master earphone and the slave earphone, and a data transmission between the master earphone and the slave earphone is realized by forwarding data, which is a whole process of a regular call transmission of Bluetooth. In an eSCO protocol of a packet of 2M (MByte), every 12 slots (time slot) is defined as a communication cycle, and the whole process mainly includes sending and receiving data, negotiating a number of times of resending, and distributing communication time for forwarding data. This one-way communication manner not only leads to a high packet loss rate, but also results in a high power consumption for the reason that each audio data packet is needed to be forwarded. Communication cannot continue once the master earphone is turned off, and this traditional manner greatly affects experience of the user using the wireless audio source device.

SUMMARY

Based on the existing situation above, a main objective of the present disclosure is to provide a method and a system for transmitting audio data, a TWS earphone pair, a chip and a medium.

To achieve the above objective, the technical solutions provided in the present disclosure are as follows.

The present disclosure provides a method for transmitting audio data, applied to a true wireless stereo (TWS) device. The TWS device comprises a TWS master device and a TWS slave device. The TWS master device is connected to an audio source device through a first link. The TWS slave device is connected to the audio source device through a monitoring link. The TWS master device and the TWS slave device are connected through a second link. The method for transmitting audio data includes following steps.

It is determined whether the TWS master device and the TWS slave device have received audio data sent from the audio source device within a preset communication cycle. The communication cycle comprises a sending and receiving time window, a resending time window, a forwarding time window, and an ACL time window, and time windows in the same communication cycle of the first link, the second link and the monitoring link are synchronous correspondingly.

The TWS master device sends a first additional packet data to the TWS slave device, and it is determined whether the TWS master device has received a second additional packet data sent from the TWS slave device, according to a first determination that the TWS master device has received the audio data.

The TWS master device forwards the audio data to the TWS slave device, and a modulator of a Bluetooth baseband corresponding to the TWS master device is controlled to be in a dormant state within a time period corresponding to the resending time window to turn off the resending time window corresponding to the TWS master device, according to a second determination that the TWS master device has not received the second additional packet data sent from the TWS slave device.

The TWS slave device sends the second additional packet data to the TWS master device, and it is determined whether the TWS slave device has received the first additional packet data sent from the TWS master device, according to a third determination that the TWS slave device has received the audio data.

The TWS slave device forwards the audio data to the TWS mater device, and a modulator of a Bluetooth baseband corresponding to the TWS slave device is controlled to be in the dormant state within the time period corresponding to the resending time window to turn off the resending time window corresponding to the TWS slave device, according to a fourth determination that the TWS slave device has not received the first additional packet data sent from the TWS master device.

In some embodiments, the method further includes following steps. The modulator of the Bluetooth baseband corresponding to the TWS master device is controlled to be in the dormant state within time periods corresponding to the resending time window and the forwarding time window to turn off the resending time window and the forwarding time window corresponding to the TWS master device, according to a fifth determination that the TWS master device has received the second additional packet data sent from the TWS slave device.

The modulator of the Bluetooth baseband corresponding to the TWS slave device is controlled to be in the dormant state within the time periods corresponding to the resending time window and the forwarding time window to turn off the resending time window and the forwarding time window corresponding to the TWS slave device, according to a sixth determination that the TWS slave device has received the first additional packet data sent from the TWS master device.

In some embodiments, the method further includes the following steps. The TWS master device receives audio data forwarded by the TWS slave device, and the modulator of the Bluetooth baseband corresponding to the TWS master device is controlled to be in the dormant state within the time period corresponding to the resending time window to turn off the resending time window corresponding to the TWS master device, according to a seventh determination that the TWS master device has not received the audio data sent from the audio source device, and after the second additional packet data sent from the TWS slave device is received by the TWS master device.

The TWS slave device receives audio data forwarded by the TWS master device, and the modulator of the Bluetooth baseband corresponding to the TWS slave device is controlled to be in the dormant state within the time period corresponding to the resending time window to turn off the resending time window corresponding to the TWS slave device, according to an eighth determination that the TWS slave device has not received the audio data sent from the audio source device, and after the first additional packet data sent from the TWS master device is received by the TWS slave device.

In some embodiments, the method further includes the following steps. The TWS master device sends an acknowledgement message to the audio source device, after both the TWS master device and the TWS slave device have received the audio data.

In some embodiments, the TWS master device forwarding the audio data to the TWS slave device includes forwarding, by the TWS master device, the audio data to the TWS slave device within a time period corresponding to the forwarding time window of a current communication cycle.

In some embodiments, the first link, the second link and the monitoring link are established through an extended synchronous connection-oriented (eSCO) protocol, and a time period of one communication cycle is 12 slots. The sending and receiving time window occupies 2 slots, the resending time window occupies 4 slots the forwarding time window occupies 4 slots, and the ACL time window occupies 2 slots.

The present disclosure also provides a system for transmitting audio data, and the system includes a TWS device. The TWS comprises a TWS master device and a TWS slave device. The TWS master device is connected to an audio source device through a first link. The TWS slave device is connected to the audio source device through a monitoring link. The TWS master device and the TWS slave device are connected through a second link.

The TWS master device is configured to: determine whether audio data sent from the audio source device is received by the TWS master device within a preset communication cycle; when the audio data is received by the TWS master device, send a first additional packet data to the TWS slave device, and determine whether a second additional packet data sent from the TWS slave device is received by the TWS master device; and when the second additional packet data sent from the TWS slave device is not received by the TWS master device, forward the audio data to the TWS slave device, and control a modulator of a Bluetooth baseband corresponding to the TWS master device to be in a dormant state within a time period corresponding to a resending time window to turn off the resending time window corresponding to the TWS master device, wherein the communication cycle comprises a sending and receiving time window, the resending time window, a forwarding time window and an ACL time window, and time windows in the same communication cycle of the first link, the second link and the monitoring link are synchronous correspondingly.

The TWS slave device is configured to: determine whether the audio data sent from the audio source device is received by the TWS slave device within the preset communication cycle; when the audio data is received by the TWS slave device, send the second additional packet data to the TWS master device, and determine whether the first additional packet data sent from the TWS master device is received by the TWS slave device; and when the TWS slave device has not received the first additional packet data sent from the TWS master device, forward the audio data to the TWS mater device, and control a modulator of a Bluetooth baseband corresponding to the TWS slave device to be in the dormant state within the time period corresponding to the resending time window to turn off the resending time window corresponding to the TWS slave device.

In some embodiments, the TWS master device is further configured to, after receiving the second additional packet data sent from the TWS slave device, control the modulator of the Bluetooth baseband corresponding to the TWS master device to be in the dormant state within time periods corresponding to the resending time window and the forwarding time window to turn off the resending time window and the forwarding time window corresponding to the TWS master device.

The TWS slave device is further configured to, after receiving the first additional packet data sent from the TWS master device, control the modulator of the Bluetooth baseband corresponding to the TWS slave device to be in the dormant state within the time periods corresponding to the resending time window and the forwarding time window to turn off the resending time window and the forwarding time window corresponding to the TWS slave device.

In some embodiments, the TWS master device is further configured to, after failing to receive the audio data but receiving the second additional packet data sent from the TWS slave device, receive audio data forwarded by the TWS slave device, and control the modulator of the Bluetooth baseband corresponding to the TWS master device to be in the dormant state within the time period corresponding to the resending time window to turn off the resending time window corresponding to the TWS master device.

In some embodiments, the TWS slave device is further configured to, after failing to receive the audio data but receiving the first additional packet data sent from the TWS master device, receive audio data forwarded by the TWS master device, and control the modulator of the Bluetooth baseband corresponding to the TWS slave device to be in the dormant state within the time period corresponding to the resending time window to turn off the resending time window corresponding to the TWS slave device.

In some embodiments, the TWS master device is further configured to, after both the TWS master device and the TWS slave device have received the audio data, send an acknowledgement message to the audio source device.

In some embodiments, the TWS master device is further configured to forward the audio data to the TWS slave device within a time period corresponding to the forwarding time window of the current communication cycle.

In some embodiments, the first link, the second link and the monitoring link are established through an eSCO protocol, and a time period of one communication cycle is configured to be 12 slots. The sending and receiving time window is configured to occupy 2 slots, the resending time window is configured to occupy 4 slots, the forwarding time window is configured to occupy 4 slots, and the ACL time window is configured to occupy 2 slots.

The present disclosure also provides a TWS earphone pair including a left earphone and a right earphone. Any one of the left earphone and the right earphone is configured to be a TWS master device, and another one is configured to be a TWS slave device, and the left earphone and the right earphone jointly perform the methods above.

The present disclosure also provides a chip including an integrated circuit. The integrated circuit comprises the system for transmitting audio data of described above.

The present disclosure also provides a non-transitory computer-readable storage medium, having computer programs stored thereon. The computer programs, when being executed by a processor, cause the processor to perform the method for transmitting audio data.

Beneficial Effects

It is determined whether the TWS master device and the TWS slave device have received the audio data sent from an audio source device within the preset communication cycle. When the TWS master device has received the audio data, the TWS master device sends the first additional packet data to the TWS slave device, and it is determined whether the TWS master device has received the second additional packet data sent from the TWS slave device. If the TWS master device has not received the second additional packet data sent from the TWS slave device, the TWS master device forwards the audio data to the TWS slave device. The modulator of the Bluetooth baseband corresponding to the TWS master device is controlled to be in the dormant state within the time period corresponding to the resending time window to turn off the resending time window corresponding to the TWS master device. When the TWS slave device has received the audio data, the TWS slave device sends the second additional packet data to the TWS master device, and it is determined whether the TWS slave device has received the first additional packet data sent from the TWS master device. If the TWS slave device has not received the first additional packet data sent from the TWS master device, the TWS slave device forwards the audio data to the TWS mater device, and the modulator of the Bluetooth baseband corresponding to the TWS slave device is controlled to be in the dormant state within the time period corresponding to the resending time window to turn off the resending time window corresponding to the TWS slave device. The communication cycle includes the sending and receiving time window, the resending time window, the forwarding time window and the ACL time window, and the time windows in the same communication cycle of the first link, the second link and the monitoring link are synchronous correspondingly. The present application achieves the effects that, when any one of the TWS master device and the TWS slave device has received the audio data sent from the audio source device, it sends additional packet data to the other one, and when the other one has not received the additional packet data forwarded by the any one of the TWS master device and the TWS slave device, the audio data received by the any one of the TWS master device and the TWS slave device is forwarded to the other one, thereby reducing the packet loss rate during the audio data transmission. After both the TWS master device and the TWS slave device have received the audio data, the corresponding resending time windows thereof are turned off to reduce the power consumption within the time period corresponding to the resending time windows. That is, the power consumption during the audio data transmission between the TWS master device and the TWS slave device is reduced.

Other beneficial effects of the present disclosure will be described in the specific embodiments through the introduction of specific technical features and technical solutions. Those skilled in the art should be able to understand the beneficial technical effects brought by the technical features and technical solutions based on the introduction of these technical features and technical solutions.

BRIEF DESCRIPTION OF THE DRAWINGS

Some implementations according to the present disclosure will be described below with reference to the drawings.

DETAILED DESCRIPTION OF THE EMBODIMENTS

Currently, the packet loss rate of the audio data transmission is high, and the power consumption of the audio data transmission between the TWS master device and the TWS slave device is high.

Figure 1:
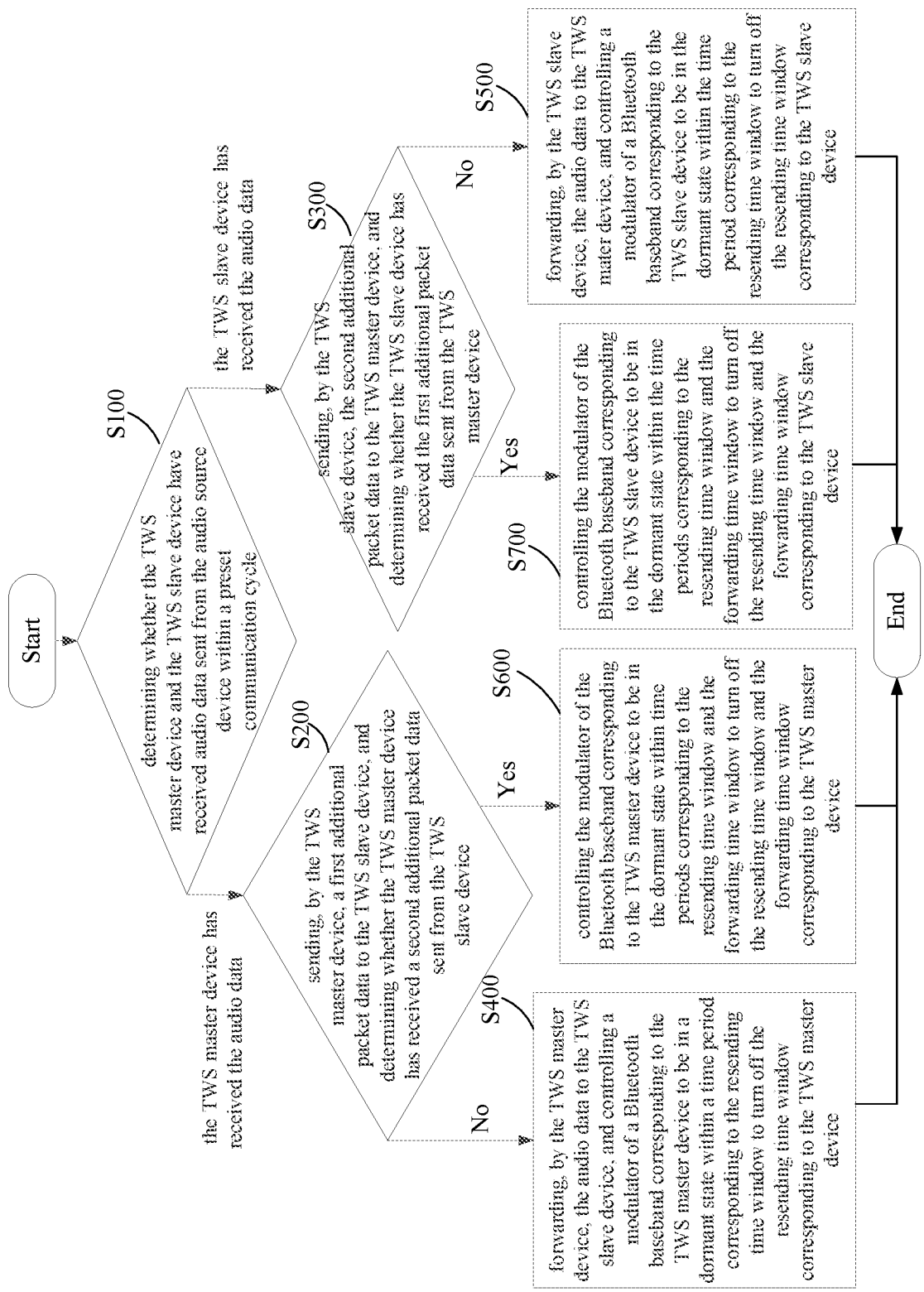
FIG. 1 is a flow chart of an embodiment of a method for transmitting audio data of the present disclosure.

FIG. 1 is a flow chart of an embodiment of a method for transmitting audio data of the present disclosure, and the method includes the following steps.

It should be noted that, in the present disclosure, step references (letters or numbers) are used to represent some specific steps of a method only for the purpose of convenience and brevity of description, and the order of these steps of the method is by no means limited by these letters or numbers. Those skilled in the art can understand that the order of related steps of the method should be determined by the technique itself, but should not be unduly limited due to the existence of the step references.

In an embodiment, an executing subject of the method of the present disclosure is a TWS device, and specifically, a processor in the PATS device.

At Step S100, it is determined whether a TWS master device and a TWS slave device receive audio data sent from an audio source device within a preset communication cycle, step S200 is performed when the TWS master device receives the audio data, and step S300 is performed when the TWS slave device has received the audio data. The communication cycle includes a sending and receiving time window, a resending time window, a forwarding time window, and an asynchronous connection less (ACL) time window, and the time windows in the same communication cycle of a first link, a second link and a monitoring link are synchronous correspondingly.

Figure 2:
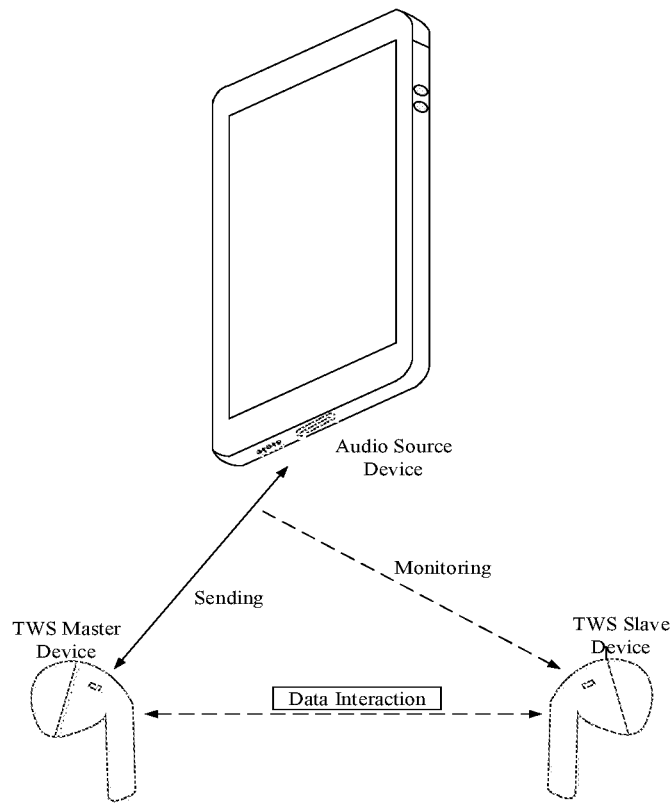
FIG. 2 is a schematic view illustrating data communication among a TWS master device, a TWS slave device and an audio source device in an embodiment of the present disclosure.

In the present embodiment, a transmission link is established between the TWS master device and the audio source device through an eSCO protocol, and another transmission link is also established between the TWS master device and the TWS slave device through the eSCO protocol. That is, the first link is established between the TWS master device and the audio source device through the eSCO protocol, and the TWS master device receives the audio data sent from the audio source device through the first link. A monitoring link is established between the TWS slave device and the audio source device through the eSCO protocol, and the TWS slave device receives the audio data through the monitoring link, which means that the TWS slave device monitors the audio data sent from the audio source device to the TWS master device through the monitoring link, so as to receive the audio data. It should be noted that the monitoring link is a virtual link, and the TWS slave device can only monitor the data transmitted between the TWS master device and the audio source device, but cannot send data to the audio source device. The second link is established between the TWS master device and the TWS slave device through the eSCO protocol, and a data interaction is performed through the second link. For the detail, please refer to FIG. 2. The audio source device includes a mobile phone, a personal computer, or a personal digital assistant that may send the audio data. The TWS master device may be a TWS Bluetooth earphone or a TWS speaker. TWS means true wireless stereo. TWS technology is also based on the development of Bluetooth chip technology, and according to its working principle, the TWS technology means that the audio source device is connected to the master device, and then the master device is quickly connected to the slave device wirelessly to achieve truly wireless and separate use of left and right audio channels of the Bluetooth.

The eSCO protocol is a protocol of Bluetooth communication. In the present embodiment, taking a data packet of 2M as an example, in the eSCO protocol, every 12 slots (time slot) is defined as a communication cycle T_sco, and the communication cycle includes four time windows in total. These four time windows include the sending and receiving time window Trsvd, the resending time window W_sco, the forwarding time window, and the time window corresponding to ACL communication. That is, relevant parameters of the eSCO protocol include the communication cycle, the sending and receiving time window, the resending time window, the forwarding time window, and the time window corresponding to ACL communication. For convenience of description, in the present embodiment, the time window corresponding to ACL communication is referred to as the ACL time window. Each communication cycle includes the sending and receiving time window, the resending time window, the forwarding time window, and the ACL time window. In the present embodiment, in order to ensure that the TWS slave device can monitor the same data during the data transmission process between the TWS master device and the audio source device, before data transmission between the TWS master device and the audio source device, the time windows in the same communication cycle of the first link, the second link and the monitoring link are synchronous correspondingly.

Figure 3:
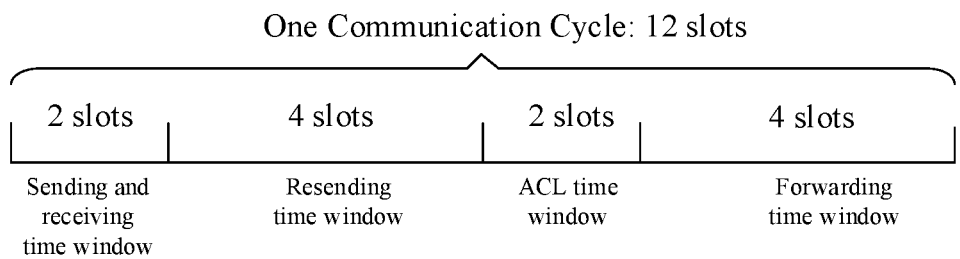
FIG. 3 is a schematic view illustrating a communication cycle corresponding to an eSCO protocol in an embodiment of the present disclosure.
Figure 4:
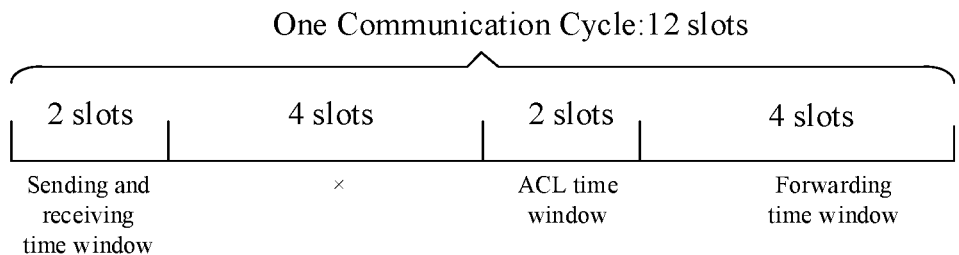
FIG. 4 is a schematic view illustrating turning off a resending time window in an embodiment of the present disclosure.
Figure 5:
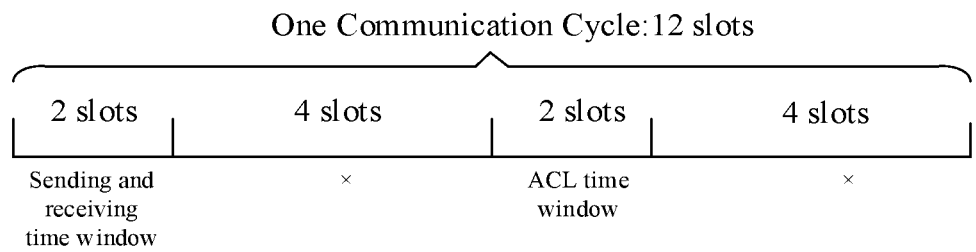
FIG. 5 is a schematic view illustrating turning off the resending time window and a forwarding time window in an embodiment of the present disclosure.

Specifically, the sending and receiving time window is configured to send and receive data, such as data between the TWS master device and the audio source device, and data between the TWS master device and the TWS slave device, etc. The resending time window is configured for the audio source device to resend data to the TWS master device. The forwarding time window is configured for forwarding data between the TWS master device and the TWS slave device. The ACL time window is configured for ACL communication, for controlling data space of command transmission, and for switching the ACL communication between the TWS master device and the TWS slave device every 10 slots, so as to synchronize frequency points and related data of the TWS master device and the TWS slave device. Specifically, taking the data packet of 2M as an example, according to the eSCO protocol, every 12 slots is defined as one communication cycle, the sending and receiving time window occupies 2 slots, the resending time window occupies 4 slots, the forwarding time window occupies 4 slots, and the time window corresponding to ACL communication occupies 2 slots. For the detail, please refer to FIG. 3. After the TWS master device and the TWS slave device are powered on, it is determined whether the TWS master device and the TWS slave device have received the audio data sent from the audio source device within the preset communication cycle, that is, it is determined whether the TWS master device and the TWS slave device have received the audio data sent from the audio source device during the current communication cycle.

At Step S200 the TWS master device sends a first additional packet data to the TWS slave device, and it is determined whether the TWS master device receives a second additional packet data sent from the TWS slave device, and step S400 is performed when the TWS master device has not received the second additional packet data sent from the TWS slave device.

When the TWS master device receives the audio data sent from the audio source device, the TWS master device generates the first additional packet data and sends the first additional packet data to the TWS slave device. The additional packet data is a notification message, which may tell the TWS slave device that the TWS master device has received the audio data sent from the audio source device. The specific data in the additional packet data may be set according to specific needs. The present embodiment does not limit the form of the additional packet data. The additional packet data should be distinguished from normal audio data to prevent the TWS slave device from identifying the additional packet data as the audio data. Therefore, in terms of the audio data, the additional packet data is an erroneous audio data. After the TWS master device sends the first additional packet data to the TWS slave device, it is determined whether the TWS master device receive the second packet data sent from the TWS slave device. It should be noted that, when the TWS slave device monitors the audio data, the TWS slave device generates the second additional packet data and send it to the TWS master device. It may be understood that, in the present embodiment, as long as one of the TWS devices receives the audio data, it will send additional packet data to the other TWS device, so as to tell the other TWS device by means of the additional packet data that it has received the audio data. It should be noted that the present embodiment realizes sending the additional packet data without affecting the sending and receiving time window corresponding to the eSCO protocol, that is, the sending and receiving additional packet data is added on the basis of not affecting the sending and receiving time window, so as to rationally distribute and use the time axis of the whole communication cycle. Specifically, the transmission of additional packet data adopts a special Bluetooth baseband modulation manner, and the additional packet data is received and sent in a gap of the sending and receiving time window, that is, the additional packet data is sent in the gap between receiving data and sending data in the sending and receiving time window.

At Step S400, the audio data is forwarded to the TWS slave device, and a modulator of a Bluetooth baseband corresponding to the TWS master device is controlled to be in a dormant state within a time period corresponding to the resending time window, so as to turn off the resending time window corresponding to the TWS master device.

If the TWS master device has not received the second packet data sent from the TWS slave device, it indicates that the TWS slave device has not received the audio data. In this case, the TWS master device forwards the received audio data to the TWS slave device. After the TWS master device forwards the audio data to the TWS slave device, it indicates that both the TWS master device and the TWS slave device have received the audio data, and the audio source device does not need to resend the audio data. Therefore, the modulator of the Bluetooth baseband corresponding to the TWS master device is controlled to be in the dormant state within the time period corresponding to the resending time window, so as to turn off the resending time window corresponding to the TWS master device. It should be noted that when the resending time window corresponding to the TWS master device is turned off, a resending time window corresponding to the first link between the TWS master device and the audio source device, and a resending time window corresponding to the second link between the TWS master device and the TWS slave device are both turned off.

In some embodiments, after the TWS master device forwards the audio data to the TWS slave device, the TWS master device generates an acknowledgement message ACK (Acknowledgement character), and sends the acknowledgement message to the audio source device. After the audio source device receives the acknowledgement message, the audio source device may determine, according to the acknowledgement message, that the TWS master device and the TWS slave device have successfully received the audio data in the present embodiment, the representation form of the acknowledgement message is not limited. For example, the acknowledgement message may be represented by numbers and/or letters.

In some embodiments, at the step S400, the forwarding the audio data to the TWS slave device includes forwarding the audio data to the TWS slave device within a time period corresponding to the forwarding time window of the current communication cycle.

The audio data is forwarded between the TWS master device and the TWS slave device during the forwarding time window. The time slot size of the forwarding time window determines the number of times of forwarding audio data in each communication cycle. The audio data may be forwarded once in 2 slots. For example, when the audio data is forwarded by the TWS master device to the TWS slave device, it takes 1 slot for the TWS master device to send the audio data to the TWS slave device, and it takes 1 slot for the TWS slave device to receive the audio data sent from the TWS master device. Therefore, if the TWS master device has not received the second additional packet data sent from the TWS slave device, the time slot size of the forwarding time window for forwarding audio data between the TWS master device determines and the TWS slave device is determined, and the number of times of forwarding the audio data is determined according to the time slot size, and the TWS master device forwards the audio data to the TWS slave device according to the number of times of forwarding audio data. That is, the TWS master device forwards the audio data to the TWS slave device within the time period corresponding to the forwarding time window of the current communication cycle, till the time period corresponding to the forwarding time window ends. It should be noted that when the TWS master device forwards the audio data to the TWS slave device within the time period corresponding to the forwarding time window, it forwards the audio data to the TWS slave device at a certain time interval, rather than forward the audio data to the TWS slave device for the second time only after failing to forward the audio data to the TWS slave device for the first time. For example, when the time slot size of the forwarding time window is 4 slots, the corresponding number of times for forwarding is two, that is, the TWS master device forwards the audio data to the TWS slave device twice after determining that the TWS master device has not received the second additional packet data sent from the TWS slave device, so as to improve the success rate of forwarding the audio data between the TWS master device and the TWS slave device.

At Step S300, the TWS slave device sends the second additional packet data to the TWS master device, and it is determined whether the TWS slave device has received the first additional packet data sent from the TWS master device, and step S500 is performed when the TWS slave device has not received the first additional packet data sent from the TWS master device.

At Step S500, the audio data is forwarded to the TWS mater device, and a modulator of a Bluetooth baseband corresponding to the TWS slave device is controlled to be in the dormant state within the time period corresponding to the resending time window, so as to turn off the resending time window corresponding to the TWS slave device.

When the TWS slave device has received the audio data, that is, the TWS slave device has monitored the audio data, the TWS slave device generates the second additional packet data and sends the second additional packet data to the TWS master device. After the TWS slave device sends the second additional packet data to the TWS master device, it is determined whether the TWS slave device has received the first additional packet data sent from the TWS master device. If the TWS slave device has not received the first additional packet data sent from the TWS master device, the TWS slave device forwards the audio data to the TWS master device through the forwarding time window, and the modulator of the Bluetooth baseband corresponding to the TWS slave device is controlled to be in the dormant state within the time period corresponding to the resending time window, so as to turn off the resending time window corresponding to the TWS slave device. At this time, the resending time windows of the second link and the monitoring link corresponding to the TWS slave device are both turned off.

In some embodiments, after the TWS master device receives the audio data, the acknowledgement message is generated and sent to the audio source device, so that the audio source device may determine, according to the acknowledgement message, that the TWS master device and the TWS slave device have successfully obtained the audio data.

In the present embodiment, it is determined whether the TWS master device and the TWS slave device have received the audio data sent from the audio source device within a preset communication cycle. When the TWS master device has received the audio data, the TWS master device sends first additional packet data to the TWS slave device, and it is determined whether the TWS master device has received the second additional packet data sent from the TWS slave device, and when the TWS master device has not received the second additional packet data sent from the TWS slave device, the audio data is forwarded to the TWS slave device, and the modulator of the Bluetooth baseband corresponding to the TWS master device is controlled to be in the dormant state within the time period corresponding to the resending time window, so as to turn off the resending time window corresponding to the TWS master device. When the TWS slave device has received the audio data, the TWS slave device sends the second additional packet data to the TWS master device, and it is determined whether the TWS slave device has received the first additional packet data sent from the TWS master device. When the TWS slave device has not received the first additional packet data sent from the TWS master device, the audio data is forwarded to the TWS mater device, and the modulator of the Bluetooth baseband corresponding to the TWS slave device is controlled to be in the dormant state within the time period corresponding to the resending time window, so as to turn off the resending time window corresponding to the TWS slave device. The communication cycle includes the sending and receiving time window, the resending time window, the forwarding time window, and the ACL time window, and the time windows in the same communication cycle of the first link, the second link and the monitoring link are synchronous correspondingly. The present application achieves the effects that, when any one of the TWS master device and the TWS slave device has received the audio data sent from the audio source device, it sends additional packet data to the other one, and when the other one has not received the additional packet data forwarded by the any one of the TWS master device and the TWS slave device, the audio data received by the any one of the TWS master device and the TWS slave device is forwarded to the other one, thereby reducing the packet loss rate during the audio data transmission. After both the TWS master device and the TWS slave device have received the audio data, the corresponding resending time windows thereof are turned off to reduce the power consumption within the time period corresponding to the resending time windows. That is, the power consumption during the audio data transmission between the TWS master device and the TWS slave device is reduced.

In some embodiments, step S600 is performed when, in the step S200, the TWS master device has received the second additional packet data sent from the TWS slave device.

At Step S600, the modulator of the Bluetooth baseband corresponding to the TWS master device is controlled to be in the dormant state within time periods corresponding to the resending time window and the forwarding time window, so as to turn of the resending time window and the forwarding time window corresponding to the TWS master device.

When the TWS master device receives the audio data in the current communication cycle, and receives the second additional packet data sent from the TWS slave device, it indicates that the TWS slave device has also received the audio data, and the TWS master device is not needed to forward the audio data to the TWS slave device. The modulator of the Bluetooth baseband corresponding to the TWS master device is controlled to be in the dormant state within the time periods corresponding to the resending time window and the forwarding time window, so as to turn off the resending time window and the forwarding time window corresponding to the TWS master device.

In some embodiments, step S700 is performed when, in step S300, the TWS slave device receives the first additional packet data sent from the TWS master device.

At Step S700, the modulator of the Bluetooth baseband corresponding to the TWS slave device is controlled to be in the dormant state within the time periods corresponding to the resending time window and the forwarding time window, so as to turn off the resending time window and the forwarding time window corresponding to the TWS slave device.

When the TWS slave device receives the audio data in the current communication cycle and receives the first additional packet data sent from the TWS master device, it indicates that the TWS master device has also received the audio data, and the TWS slave device is not needed to forward the audio data to the TWS master device, and the modulator of the Bluetooth baseband corresponding to the TWS slave device is controlled to be in the dormant state within the time periods corresponding to the resending time window and the forwarding time window, so as to turn off the resending time window and the forwarding time window corresponding to the TWS slave device.

It should be noted that, when the TWS master device and the TWS slave device turn off corresponding time windows, they turn off both of the time windows corresponding to the two links, respectively.

In the present embodiment, when the TWS master device or the TWS slave device has received the audio data itself, and when it is determined that the other one also have received the audio data according to the additional packet data, the audio data would not be forwarded, which avoids forwarding each audio data, and reduces the power consumption during the audio data transmission. Meanwhile, when the audio data is not needed to be forwarded and resent, the corresponding resending time window and the forwarding time window are turned off, which further reduces the power consumption during the audio data transmission.

In the present disclosure, a second embodiment of the method for transmitting audio data is provided.

The second embodiment of the method for transmitting audio data differs from the above embodiments of the method for transmitting audio data in that the method for transmitting audio data further includes the following steps.

Step S800 is performed when, in the step S100, the TWS master device has not received the audio data, and after the TWS master device receives the second additional packet data sent from the TWS slave device.

At Step S800, the audio data forwarded bar the TWS slave device is received, and the modulator of the Bluetooth baseband corresponding to the TWS master device is controlled to be in the dormant state within the time period corresponding to the resending time window so as to turn off the resending time window corresponding to the TWS master device.

If the TWS master device has not received the audio data within the current communication cycle, it is determined whether the TWS master device has received the second additional packet data sent from the TWS slave device. If the TWS master device has received the second additional packet data sent from the TWS slave device, it indicates that the TWS slave device has monitored the audio data. In this case, the TWS master device may receive the audio data forwarded by the TWS slave device. After the TWS master device receives the audio data forwarded by the TAWS slave device, the modulator of the Bluetooth baseband corresponding to the TWS master device is controlled to be in the dormant state within the time period corresponding to the resending time window, so as to turn off the resending time window corresponding to the TWS master device.

In some embodiments, when the TWS master device has received the audio data forwarded by the TWS slave device, the TWS master device sends the acknowledgement message to the audio source device, so that the audio source device determines, according to the acknowledgement message, that the TWS master device and the TWS slave device have successfully received the audio data. If the TWS master device does not receive the audio data and the second additional packet data sent from the TWS slave device, the TWS master device controls the modulator of the Bluetooth baseband to be in the dormant state within the time period corresponding to the forwarding time window, so as to turn off the forwarding time window corresponding to the TWS master device, that is, turn off the forwarding time window for forwarding the audio data between the TWS master device and the TWS slave device. In this case, the audio source device is needed to resend the audio data.

Step S900 is performed when, in the step S100, the TWS slave device has not received the audio data, and after the TWS slave device receives the first additional packet data sent from the TWS master device.

At Step S900, the audio data forwarded by the TWS master device is received, and the modulator of the Bluetooth baseband corresponding to the TWS slave device is controlled to be in the dormant state within the time period corresponding to the resending time window, so as to turn off the resending time window corresponding to the TWS slave device.

If the TWS slave device has not received the audio data, that is, the audio data has not been monitored, it is determined whether the TWS slave device receives the first additional packet data sent from the TWS master device. When the TWS slave device has received the first additional packet data sent from the TWS master device, the TWS slave device receives the audio data forwarded by the TWS master device through the forwarding time window, and controls the modulator of the Bluetooth baseband corresponding to the TWS slave device to be in the dormant state within the time period corresponding to the resending time window, so as to turn off the resending time window corresponding to the TWS slave device. In some embodiments, if the TWS slave device has not monitored the audio data and has not received the audio data forwarded by the TWS master device, the TWS slave device controls the modulator of the Bluetooth baseband to be in the dormant state within the time period corresponding to the forwarding time window, so as to turn off the forwarding time window corresponding to the TWS slave device. In this case, the audio source device is needed to reseed the audio data.

In some embodiments, step S110 is performed after both the TWS master device and the TWS slave device have received the audio data.

Step S110, the TWS master device sends an acknowledgement message to the audio source device, so that the audio source device determines, according to the acknowledgement message, that the TWS master device and the TWS slave device have received the audio data.

It should be noted that, no matter Whether the audio data received by the TWS master device and the TWS slave device is received directly from the audio source device or forwarded by the other one, after both the TWS master device and the TWS slave device have received the audio data, the TWS master device will send the acknowledgement message to the audio source device, so that the audio source device determines, according to the acknowledgement message, that the TWS master device and the TWS slave device have received the audio data.

In the present embodiment, when one of the TWS master device and the TWS slave device has not received audio data, but the other one has received the audio data, the one of the TWS master device and the TWS slave device receives the audio data forwarded by the other one, and turns off the resending time window, which improves the success rate of the audio data transmission, reduces the power consumption during audio data transmission, reduces the modulation time of the modulator, thereby reducing time of interaction between the TWS master device and the TWS slave device in one communication cycle). What's more, the present embodiment can avoid the case that only one of the TWS master device and the TWS slave device has received the audio data, while the other one has not received the audio data, thereby enhancing a stereo call effect and improving the communication quality.

In some embodiments, when neither the TWS master device nor the TWS slave device has received the audio data, and neither the TWS master device nor the TWS slave device has received the audio data forwarded by the other one, the TWS master device will not send the acknowledgement message to the audio source device. When the audio source device has not received the acknowledgement message sent from the TWS master device within a preset time period, the audio source device will resend the audio data to the TWS master device. At this time, it is re-determined whether the TWS master device receives the audio data sent from the audio source device, and also it is re-determined whether the TWS slave device has monitored the audio data. When the TWS master device has successfully received the audio data this time, the TWS master device will replace the erroneous data received last time with the currently received audio data. When the TWS slave device has successfully received the audio data this time, the TWS slave device will replace the erroneous data received last time with the currently obtained audio data. It should be noted that when the TWS master device and the TWS slave device fail to receive the audio data, it does not mean that the TWS master device and the TWS slave device have not obtained any data, but that the TWS master device and the TWS slave device have not received the correct audio data. In the present embodiment, the number of times that the audio source device resends the audio data is determined according to the time slot size of the resending time window, and every 2 slots corresponds to one resending. In the present embodiment, when neither the TWS master device nor the TWS slave device can successfully obtain the audio data, the audio source device resends the audio data, thereby improving the success rate of the audio data transmission and the accuracy of the audio data transmission.

Figure 6:
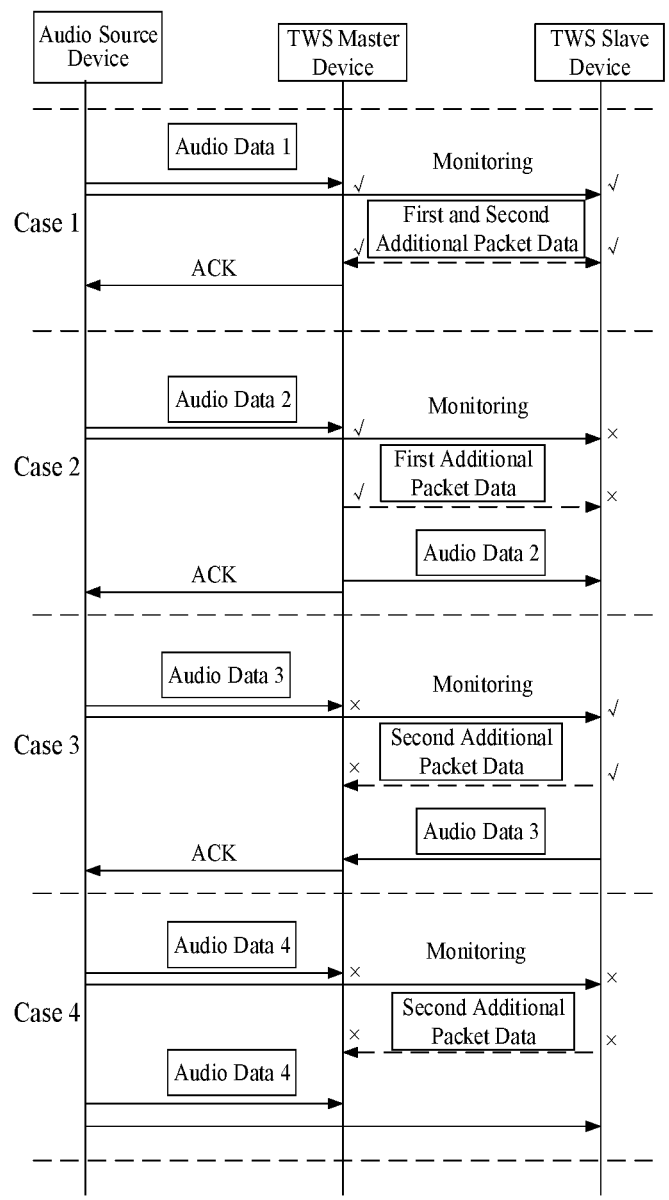
FIG. 6 is a schematic view illustrating data interaction among the TWS master device, the TWS slave device, and the audio source device in an embodiment of the present disclosure.

Specifically, referring to FIG. 6, in FIG. 6, the data transmission among the audio source device, the TWS master device and the TWS slave device is divided into four cases. "√" in FIG. 6 denotes that the data transmission is successful, and "x" denotes that the data transmission fails. In case 1, the TWS master device has received the audio data 1 sent from the audio source device, and the TWS slave device has monitored the audio data 1. At this time, both the TWS master device and the TWS slave device will send the additional packet data to each other, and after receiving the second additional packet data sent from the TWS slave device, the TWS master device will send the acknowledgment message (ACK) to the audio source device. In case 2, the TWS master device has received the audio data 2 sent from the audio source device, but the TWS slave device has not monitored the audio data 2. At this time, the TWS master device sends the first additional packet data to the TWS slave device, hut the TWS slave device will not send the second additional packet data to the TWS master device. The TWS master device will forward the audio data 2 to the TWS slave device, and send the ACK to the audio source device after forwarding the audio data 2 to the TWS slave device. In case 3, the TWS master device has not received the audio data 3 sent from the audio source device, but the TWS slave device has monitored the audio data 3. At this time, the TWS master device will not send the first additional packet data to the TWS slave device, but the TWS slave device sends the second additional packet data to the TWS master device and forwards the audio data 3 to the TWS master device. After receiving the audio data 3, the TWS master device sends the ACK to the audio source device. In case 4, the TWS master device has not received the audio data 4 sent from the audio source device, and the TWS slave device has not monitored the audio data 4 either. At this time, neither the TWS master device nor the TWS slave device will send the corresponding additional packet data to each other, and the audio source device is needed to resend the audio data 4.

The present disclosure also provides a system for transmitting audio data The system includes a TWS master device and a TWS slave device. The TWS master device receives audio data sent from an audio source device through a first link, the TWS slave device receives the audio data through a monitoring link, and the TWS master device and the TWS slave device perform a data interaction through a second link.

The TWS master device is capable of determining whether the TWS master device receives the audio data sent from the audio source device within a preset communication cycle; when the TWS master device receives the audio data, sending first additional packet data to the TWS slave device, and determining whether the TWS master device receives the second additional packet data sent from the TWS slave device; and if the TWS master device has not received the second additional packet data sent from the TWS slave device, forwarding the audio data to the TWS slave device, and controlling a modulator of a Bluetooth baseband corresponding to the TWS master device to be in a dormant state within a time period corresponding to a resending time window, so as to turn off the resending time window corresponding to the TWS master device. The communication cycle includes a sending and receiving time window, the resending time window, a forwarding time window, and an ACL time window, and the time windows in the same communication cycle of the first link, the second link and the monitoring link are synchronous correspondingly.

The TWS slave device is capable of determining whether the TWS slave device receives the audio data sent from the audio source device within the preset communication cycle when the TWS slave device receives the audio data, sending the second additional packet data to the TWS master device, and determining whether the TWS slave device receives first additional packet data seat from the TWS master device; and when the TWS slave device has not received the first additional packet data sent from the TWS master device, forwarding the audio data to the TWS mater device, and controlling a modulator of a Bluetooth baseband corresponding to the TWS slave device to be in the dormant state within the time period corresponding to the resending time window, so as to turn off the resending time window corresponding to the TWS slave device.

In some embodiments, the TWS master device is further capable of controlling the modulator of the Bluetooth baseband corresponding to the TWS master device to be in the dormant state within the time periods corresponding to the resending time window and the forwarding time window after receiving the second additional packet data sent from the TWS slave device, so as to turn off the resending time window and the forwarding time window corresponding to the TWS master device.

In some embodiments, the TWS slave device is further capable of controlling the modulator of the Bluetooth baseband corresponding to the TWS slave device to be in the dormant state within the time periods corresponding to the resending time window and the forwarding time window after receiving the first additional packet data sent from the TWS master device, so as to turn off the resending time window and the forwarding time window corresponding to the TWS slave device.

In some embodiments, the TWS master device is further capable of receiving the audio data forwarded by the TWS slave device after failing to receive the audio data but receiving the second additional packet data sent from the TWS slave device, and controlling the modulator of the Bluetooth baseband corresponding to the TWS master device to be in the dormant state within the time period corresponding to the resending time window, so as to turn off the resending time window corresponding to the TWS master device.

The TWS slave device is further capable of receiving the audio data forwarded by the TWS master device after tailing to receive the audio data but receiving the first additional packet data sent from the TWS master device, and controlling the modulator of the Bluetooth baseband corresponding to the TWS slave device to be in the dormant state within the time period corresponding to the resending time window, so as to turn off the resending time window corresponding to the TWS slave device.

In some embodiments, the TWS master device is further capable of sending an acknowledgement message to the audio source device after both the TWS master device and the TWS slave device have received the audio data, so that the audio source device determines, according to the acknowledgement message, that the TWS master device and the TWS slave device have received the audio data.

In some embodiments, the TWS master device is further capable of forwarding the audio data to the TWS slave device within a time period corresponding to the forwarding time window of the current communication cycle.

In some embodiments, the first link the second link, and the monitoring link are established through an eSCO protocol, and a time period of one communication cycle includes 12 slots, where the sending and receiving time window occupies 2 slots, the resending time window occupies 4 slots, the forwarding time window occupies 4 slots, and the ACL, time window occupies 2 slots.

The specific implementations of the system for transmitting audio data of the present disclosure are basically the same as the above first embodiment and the above second embodiment of the method for transmitting audio data, and will not be described repeatedly hereinafter.

The present disclosure also provides a TWS earphone pair including a left earphone and a right earphone. Any one of the left earphone and the right earphone is used as a TWS master device, and the other one is used as a TWS slave device, so as to jointly perform the above method for transmitting audio data.

The specific implementations of the TWS earphone pair of the present disclosure are basically the same as the above first embodiment and the above second embodiment of the method for transmitting audio data, and will not be described repeatedly hereinafter.

The present disclosure also provides a chip having an integrated circuit thereon, and the integrated circuit includes the system for transmitting audio data as described above.

The specific implementations of the chip of the present disclosure are basically the same as the above systems for transmitting audio data, and will not be described repeatedly hereinafter.

The present disclosure also provides a non-transitory computer-readable storage medium having computer programs stored thereon. The computer programs, when being executed by a processor, cause the processor to perform the steps of the above methods for transmitting audio data.

The specific implementations of the non-transitory computer-readable storage medium of the present disclosure are basically the same as the above embodiments of the method for transmitting audio data, and will not be described repeatedly hereinafter.

Those skilled in the art may understand that, under the premise of no conflict, the above embodiments may be freely combined and superimposed.

It should be understood that the above implementations are only exemplary rather than restrictive, and those skilled in the art may make various obvious or equivalent modifications or substitutions based on the above details without departing from the basic principles of the present disclosure, and these modifications or substitutions will be within the scope of the claims of the present disclosure.

What is claimed is:

1. A method for transmitting audio data, applied to a true wireless stereo (TWS) device, wherein:
   the TWS device includes a TWS master device and a TWS slave device;
   the TWS master device is connected to an audio source device through a first link;
   the TWS slave device is connected to the audio source device through a monitoring link;
   the TWS master device and the TWS slave device are connected through a second link;
   the method for transmitting audio data comprising:
   determining whether the TWS master device and the TWS slave device have received audio data sent from the audio source device within a preset communication cycle, wherein the communication cycle includes a sending and receiving time window, a resending time window, a forwarding time window, and an asynchronous connection less (ACL) time window configured for ACL communication, and time windows in the same communication cycle of the first link, the second link and the monitoring link are synchronous correspondingly;
   sending, by the TWS master device, a first additional packet data to the TWS slave device, and determining whether the TWS master device has received a second additional packet data sent from the TWS slave device, according to a first determination that the TWS master device has received the audio data;
   forwarding, by the TWS master device, the audio data to the TWS slave device, and controlling a modulator of a Bluetooth baseband corresponding to the TWS master device to be in a dormant state within a time period corresponding to the resending time window to turn off the resending time window corresponding to the TWS master device, according to a second determination that the TWS master device has not received the second additional packet data sent from the TWS slave device;
   sending, by the TWS slave device, the second additional packet data to the TWS master device, and determining whether the TWS slave device has received the first additional packet data sent from the TWS master device, according to a third determination that the TWS slave device has received the audio data; and
   forwarding, by the TWS slave device, the audio data to the TWS master device, and controlling a modulator of a Bluetooth baseband corresponding to the TWS slave device to be in the dormant state within the time period corresponding to the resending time window to turn off the resending time window corresponding to the TWS slave device, according to a fourth determination that the TWS slave device has not received the first additional packet data sent from the TWS master device.

2. The method for transmitting audio data according to claim 1, further comprising:
   controlling the modulator of the Bluetooth baseband corresponding to the TWS master device to be in the dormant state within time periods corresponding to the resending time window and the forwarding time window to turn off the resending time window and the forwarding time window corresponding to the TWS master device, according to a fifth determination that the TWS master device has received the second additional packet data sent from the TWS slave device; and
   controlling the modulator of the Bluetooth baseband corresponding to the TWS slave device to be in the dormant state within the time periods corresponding to the resending time window and the forwarding time window to turn off the resending time window and the forwarding time window corresponding to the TWS slave device, according to a sixth determination that the TWS slave device has received the first additional packet data sent from the TWS master device.

3. The method for transmitting audio data according to claim 2, further comprising:
   the TWS master device receiving audio data forwarded by the TWS slave device, and controlling the modulator of the Bluetooth baseband corresponding to the TWS master device to be in the dormant state within the time period corresponding to the resending time window to turn off the resending time window corresponding to the TWS master device, according to a seventh determination that the TWS master device has not received the audio data sent from the audio source device, and after the second additional packet data sent from the TWS slave device is received by the TWS master device; and
   the TWS slave device receiving audio data forwarded by the TWS master device, and controlling the modulator of the Bluetooth baseband corresponding to the TWS slave device to be in the dormant state within the time period corresponding to the resending time window to turn off the resending time window corresponding to the TWS slave device, according to an eighth determination that the TWS slave device has not received the audio data sent from the audio source device, and after the first additional packet data sent from the TWS master device is received by the TWS slave device.

4. The method for transmitting audio data according to claim 1, further comprising
   sending, by the TWS master device, an acknowledgement message to the audio source device, after both the TWS master device and the TWS slave device have received the audio data.

5. The method for transmitting audio data according to claim 1, wherein the TWS master device forwarding the audio data to the TWS slave device includes:
   forwarding, by the TWS master device, the audio data to the TWS slave device within a time period corresponding to the forwarding time window of a current communication cycle.

6. The method for transmitting audio data according to claim 1, wherein:

the first link, the second link and the monitoring link are established through an extended synchronous connection-oriented (eSCO) protocol, and a time period of one communication cycle is 12 slots; and the sending and receiving time window occupies 2 slots, the resending time window occupies 4 slots, the forwarding time window occupies 4 slots, and the ACL time window occupies 2 slots.

7. A TWS earphone pair, comprising a left earphone and a right earphone, wherein any one of the left earphone and the right earphone is configured to be a TWS master device, and another one is configured to be a TWS slave device, and the left earphone and the right earphone jointly perform the method of claim 1.

8. A non-transitory computer-readable storage medium, having computer programs stored thereon, wherein the computer programs, when being executed by a processor, cause the processor to perform the method for transmitting audio data of claim 1.

9. A system for transmitting audio data, comprising a true wireless stereo (TWS) device, wherein:
the TWS includes a TWS master device and a TWS slave device;
the TWS master device is connected to an audio source device through a first link;
the TWS slave device is connected to the audio source device through a monitoring link;
the TWS master device and the TWS slave device are connected through a second link; and
the TWS master device is configured to: determine whether audio data sent from the audio source device is received by the TWS master device within a preset communication cycle; when the audio data is received by the TWS master device, send a first additional packet data to the TWS slave device, and determine whether a second additional packet data sent from the TWS slave device is received by the TWS master device; and when the second additional packet data sent from the TWS slave device is not received by the TWS master device, forward the audio data to the TWS slave device, and control a modulator of a Bluetooth baseband corresponding to the TWS master device to be in a dormant state within a time period corresponding to a resending time window to turn off the resending time window corresponding to the TWS master device, wherein the communication cycle includes a sending and receiving time window, the resending time window, a forwarding time window and an asynchronous connection less (ACL) time window configured for ACL communication, and time windows in the same communication cycle of the first link, the second link and the monitoring link are synchronous correspondingly; and
the TWS slave device is configured to: determine whether the audio data sent from the audio source device is received by the TWS slave device within the preset communication cycle; when the audio data is received by the TWS slave device, send the second additional packet data to the TWS master device, and determine whether the first additional packet data sent from the TWS master device is received by the TWS slave device; and when the TWS slave device has not received the first additional packet data sent from the TWS master device, forward the audio data to the TWS master device, and control a modulator of a Bluetooth baseband corresponding to the TWS slave device to be in the dormant state within the time period corresponding to the resending time window to turn off the resending time window corresponding to the TWS slave device.

10. The system for transmitting audio data according to claim 9, wherein:
the TWS master device is further configured to, after receiving the second additional packet data sent from the TWS slave device, control the modulator of the Bluetooth baseband corresponding to the TWS master device to be in the dormant state within time periods corresponding to the resending time window and the forwarding time window to turn off the resending time window and the forwarding time window corresponding to the TWS master device; and
the TWS slave device is further configured to, after receiving the first additional packet data sent from the TWS master device, control the modulator of the Bluetooth baseband corresponding to the TWS slave device to be in the dormant state within the time periods corresponding to the resending time window and the forwarding time window to turn off the resending time window and the forwarding time window corresponding to the TWS slave device.

11. The system for transmitting audio data according to claim 9, wherein:
the TWS master device is further configured to, after failing to receive the audio data but receiving the second additional packet data sent from the TWS slave device, receive audio data forwarded by the TWS slave device, and control the modulator of the Bluetooth baseband corresponding to the TWS master device to be in the dormant state within the time period corresponding to the resending time window to turn off the resending time window corresponding to the TWS master device; and
the TWS slave device is further configured to, after failing to receive the audio data but receiving the first additional packet data sent from the TWS master device, receive audio data forwarded by the TWS master device, and control the modulator of the Bluetooth baseband corresponding to the TWS slave device to be in the dormant state within the time period corresponding to the resending time window to turn off the resending time window corresponding to the TWS slave device.

12. The system for transmitting audio data according to claim 9, wherein the TWS master device is further configured to, after both the TWS master device and the TWS slave device have received the audio data, send an acknowledgement message to the audio source device.

13. The system for transmitting audio data according to claim 9, wherein the TWS master device is further configured to forward the audio data to the TWS slave device within a time period corresponding to the forwarding time window of the current communication cycle.

14. The system for transmitting audio data according to claim 9, wherein:
the first link, the second link and the monitoring link are established through an extended synchronous connection-oriented (eSCO) protocol, and a time period of one communication cycle is configured to be 12 slots; and
the sending and receiving time window is configured to occupy 2 slots, the resending time window is configured to occupy 4 slots, the forwarding time window is configured to occupy 4 slots, and the ACL time window is configured to occupy 2 slots.

\* \* \* \* \*